(12) United States Patent
Wen et al.

(10) Patent No.: US 11,757,723 B2
(45) Date of Patent: Sep. 12, 2023

(54) DISTRIBUTED SECURE STATE RECONSTRUCTION METHOD BASED ON DOUBLE-LAYER DYNAMIC SWITCHING OBSERVER

(71) Applicant: SOUTHEAST UNIVERSITY, Nanjing (CN)

(72) Inventors: Guanghui Wen, Nanjing (CN); Xuqiang Lei, Nanjing (CN); Yuezu Lv, Nanjing (CN); Dan Zhao, Nanjing (CN); Jialing Zhou, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/797,262

(22) PCT Filed: Mar. 23, 2022

(86) PCT No.: PCT/CN2022/082371
§ 371 (c)(1),
(2) Date: Aug. 3, 2022

(87) PCT Pub. No.: WO2022/227946
PCT Pub. Date: Nov. 3, 2022

(65) Prior Publication Data
US 2023/0208719 A1    Jun. 29, 2023

(30) Foreign Application Priority Data

Apr. 27, 2021  (CN) .......................... 202110458283.4

(51) Int. Cl.
*H04L 9/40*     (2022.01)
*H04L 41/12*    (2022.01)
*H04L 41/14*    (2022.01)

(52) U.S. Cl.
CPC ............ *H04L 41/12* (2013.01); *H04L 41/145* (2013.01); *H04L 63/1416* (2013.01)

(58) Field of Classification Search
CPC .... H04L 41/12; H04L 41/145; H04L 63/1416
See application file for complete search history.

(56) References Cited

U.S. PATENT DOCUMENTS 9,998,480 B1 *   6/2018  Gates ................... G06F 21/577
10,805,329 B2 * 10/2020  Abbaszadeh ...... G05B 23/0297
(Continued)

FOREIGN PATENT DOCUMENTS

CN       108681320 A      10/2018
CN       110942109 A       3/2020
(Continued)

OTHER PUBLICATIONS

Zhou, Xiuying et al., Security State Estimation and tactionon for Denial of Service Attacks, Jan. 31, 2021, pp. 69-74, Journal of Information Security Research.
(Continued)

*Primary Examiner* — Aftab N. Khan
(74) *Attorney, Agent, or Firm* — Muncy, Geissler, Olds & Lowe, P.C.

(57) ABSTRACT

The present disclosure discloses a distributed secure state reconstruction method based on a double-layer dynamic switching observer. The method includes the following steps: constructing a dynamics model of a sensing channel of a multi-agent system after the sensing channel is attacked according to the multi-agent system; building a double-layer observer for each multi-agent in combination with a specific multi-agent system model, constructing a proper observation communication topology, and designing a corresponding residual generator; analyzing dynamic information generating a residual threshold aiming at an observation model,
(Continued)

checking a magnitude between each residual signal and the threshold, dynamically switching the communication topology between the observers according to the compared magnitude, and performing a new data communication interaction; and performing iterative updating to generate new observation data in combination with self observation data and received neighbor observation information, and taking whether the residual signal is greater than a current threshold or not as a standard for determining whether a corresponding communication channel is attacked or not. According to the present disclosure, all transmission channels subjected to malicious attacks can he correctly identified, and the real state of the system can be securely reconstructed.

3 Claims, 5 Drawing Sheets

(56) References Cited

U.S. PATENT DOCUMENTS

| | | | | |
|---|---|---|---|---|
| 11,153,334 | B2* | 10/2021 | Bjarnason | H04L 63/0263 |
| 2015/0188941 | A1* | 7/2015 | Boshmaf | H04L 63/1441 |
| | | | | 726/22 |
| 2017/0093910 | A1* | 3/2017 | Gukal | H04L 63/1491 |
| 2017/0302505 | A1* | 10/2017 | Zafer | H04L 41/0631 |
| 2018/0115561 | A1* | 4/2018 | Sun | H04L 63/1416 |
| 2019/0080089 | A1* | 3/2019 | Chen | G06N 20/10 |
| 2019/0230106 | A1 | 7/2019 | Abbaszadeh et al. | |
| 2020/0329054 | A1* | 10/2020 | Bjarnason | H04L 63/205 |

FOREIGN PATENT DOCUMENTS

| | | |
|---|---|---|
| CN | 112052573 A | 12/2020 |
| CN | 112269318 A | 1/2021 |
| CN | 112532475 A | 3/2021 |
| CN | 113206842 A | 8/2021 |

OTHER PUBLICATIONS

An, Liwei et al., Distributed secure state estimation for cyber-physical systems under sensor attacks, Jul. 4, 2019, pp. 526-538, Automatica 107.

Gusrialdi, Azwirman et al., Competitive Interaction Design of Cooperative Systems Against Attacks, Jan. 12, 2018, 8 pages, IEEE Transactions on Automatic Control.

Barboni, Angelo et al., Detection of Covert Cyber-Attacks in Interconnected Systems: A Distributed Model-Based Approach, May 29, 2020, 13 pages, IEEE Transactions on Automatic Control.

* cited by examiner

DISTRIBUTED SECURE STATE RECONSTRUCTION METHOD BASED ON DOUBLE-LAYER DYNAMIC SWITCHING OBSERVER

TECHNICAL FIELD

The present disclosure relates to the technical field of secure control, and in particular to a distributed secure state reconstruction method based on a double-her dynamic switching observer.

BACKGROUND

In the 21st century, an intelligent and unmanned autonomous multi-agent system has become a research hotspot in the technical field of system and control and has been importantly applied to unmanned factories, intelligent logistics, smart cities, and other fields. Meanwhile, the important role of the multi-agent system in joint investigation, precise strikes, collaborative confrontation and the like makes it an indispensable part of the military operation field. It should be noted that the multi-agent system, while improving the system efficiency, is more vulnerable to network attacks. Especially in a remote control working environment, when the multi-agent system communicates with a remote interaction center, it is very easy for malicious attackers to manipulate part of the transmitted data, so that the remote center forms information disorders for the operation determination of multi-agents, resulting in command and decision errors, thereby seriously endangering the normal operation of the entire system and even the personal safety of relevant personnel. Due to the huge computational complexity of a traditional centralized sparse attack identification method, it is expensive to carry out state estimation of the large-scale wide-area distributed multi-agent system, and a simple decentralized or distributed state estimation method is difficult to resist the erosion of malicious attacks. Therefore, it is urgent to develop a secure state estimation method for a large-scale multi-agent system encountering sparse sensing attacks in remote communication, so as to avoid the limitations of the above method.

In the existing secure state reconstruction algorithms, the literature (L. An and G. H. Yang. Distributed secure state estimation for cyber-physical systems under sensor attacks. Automatica, 2019, 107: 526-538.) uses an observer to collect measurement data within a certain duration so as to construct an optimization problem to estimate the secure state of the system, and uses a projected gradient descent algorithm and a voting positioning algorithm to achieve the solution of the optimization problem, thereby obtaining the secure state estimation of the system and the positioning of transmission channels subjected to sparse attacks. This scheme is advantageous in accurate reconstruction of the system state and attack positioning, but disadvantageous in that it is computationally expensive and the estimation delay problem cannot be ignored when faced with time-varying attacks, and this method is still a centralized processing scheme in nature. The literature (A. Gusrialdi, Z. Qu and M. A. Simaan. Competitive interaction design of cooperative systems against attacks. IEEE Transactions on Automatic Control, 2018, 63(9): 3159-3166.), considering external attacks on a leader-follower multi-agent system, constructs a virtual hidden network system for each follower agent, and designs the interactive communication between a virtual system and a physical system using the concept of competitive interaction, so that the multi-agents can achieve flexible consistent tracking. This scheme is disadvantageous in that a consistent upper bound is required for the attacks on each agent, and it is difficult to maintain accurate tracking. The literature (A. Barboni, H. Rezaee, F. Boetn and T. Parisini. Detection of covert cyber-attacks in interconnected systems: a distributed model-based approach. IEEE Transactions on Automatic Control, 2020, 65(9): 3728-3741.) constructs a decentralized observer based on a measurement output and a distributed Luenberger observer relying on an unknown decentralized observation input for each agent respectively, positions hidden attacks to a subsystem constituted by the agents and neighbors thereof through two different observers, and positions a specific attacked agent from the subsystem through a residual threshold. The drawback of this scheme is that only one attacked agent is allowed to exist in a neighbor subsystem of a single agent, and the attack identification method can only deal with the situation that a single hidden attack exists.

SUMMARY

The technical problem to be solved by the present disclosure is to provide a distributed secure state reconstruction method based on a double-layer dynamic switching observer, which ensures that all transmission channels subjected to malicious attacks can be correctly identified and the real state of the system can be securely reconstructed through the mutual switching cooperation of the communication topology between two layers of observers, so as to provide a basis for the secure decision-making and stable operation of a multi-agent system in a network attack environment.

In order to solve the above technical problem, the present disclosure provides a distributed secure state reconstruction method based on a double-layer dynamic switching observer, including the following steps:

step 1: constructing a specific dynamics model of a sensing Channel of a studied multi-agent system after the sensing channel is attacked according to the multi-agent system;

step 2: building a double-layer observer for each multi-agent in combination with a specific multi-agent system model, constructing a proper observation communication topology, and designing a corresponding residual generator;

step 3: analyzing dynamic information generating a residual threshold aiming at an observation model, checking a magnitude between each residual signal and the threshold, dynamically switching the communication topology between the observers according to the compared magnitude, and performing a new data communication interaction; and step 4: performing iterative updating to generate new observation data in combination with self observation data and received neighbor observation information, and taking whether the residual signal is greater than a current threshold or not as a standard for determining whether a corresponding communication channel is attacked or not.

Further, the constructing a specific dynamics model of a sensing channel of a studied multi-agent system after the sensing channel is attacked according to the multi-agent system in step 1 specifically includes:

describing the dynamics model of the multi-agent system after the sensing channel is subjected to sparse attacks as follows:

$$\begin{cases} \dot{x}_i(t) = Ax_i(t) + BK\sum_{j=1}^{N} a_{ij}(x_j(t) - x_i(t)), \\ y_i(t) = Cx_i(t) + \gamma_i(t)d_i(t), \end{cases}$$

where $x_i(t)$, $y_i(t)$, $d_i(t)$ are an n-dimensional real state of an ith agent, a p-dimensional measurement output, and a p-dimensional attack input on a corresponding sensing channel, respectively, $\alpha_{ij}$ represents weight information between two agents, $\gamma_i(t) \in \{0,1\}$ represents whether the sensing channel corresponding to the ith agent is attacked or not, $$\left| \sum_{i=1}^{N} \gamma_i(t) \right| < s < N/2,$$

and N is the number of agents; matrices A,B,C are a system state parameter matrix and a measurement matrix, respectively, and a matrix $K=1/\lambda_2^L B^T P^{-1}$ is a consistency control input matrix and satisfies, for a positive definite matrix P and a constant $\kappa > 0$, the following LMI: $AP+PA^T-2BB^T+\kappa P<0$, where $\lambda_2^L$ is a second small characteristic root of a Laplacian matrix L corresponding to the communication topology of the multi-agent system.

Then, the building a double-layer observer for each multi-agent in combination with a specific multi-agent system model, constructing a proper observation communication topology, and designing a corresponding residual generator in step 2 specifically includes the following steps:

step 201: constructing a double-layer observer based on residual information for each agent, where when determining that a corresponding sensing channel is not attacked, the first-layer observer estimates the state of the multi-agent system mainly using a measurement residual, and sends observation data thereof to a second-layer observation neighbor otherwise, when determining that the sensing channel is attacked, the observer achieves state observation using an error between the two layers of observers, and stops sending the observation data to the neighbor; and the second-layer observer performs distributed state estimation mainly based on the observation data sent by the observation neighbor thereof, and sends observation data. thereof to the observation neighbor thereof only after the observer determines that the corresponding sensing channel is attacked; and step 202: constructing a corresponding residual generator based on the dynamics model of the multi-agent and the double-layer observer, specifically as follows:

an observation residual of an agent i is denoted as $\varepsilon_i(t)=y_i(t)-C\hat{x}_i^1(t)$, and a corresponding test residual is composed of an observation residual and a Lyapunov matrix, and denoted as $z_i(t)=\|Q^{-T}C^T\varepsilon_i(t)\|^2$, where $Q^TQ=P$ is the Lyapunov matrix.

The analyzing dynamic information generating a residual threshold aiming at an observation model, checking a magnitude between each residual signal and the threshold, dynamically switching the communication topology between the observers according to the compared magnitude, and performing a new data communication interaction in step 3 specifically includes the following steps:

step 301: determining, for each observer i, an upper bound of an initialization observation error threshold $\rho_i(0) = \|Q^{-T}C^T\varepsilon_i(0)\|^2$ as prior information thereof by default; otherwise, obtaining a common initialization error upper bound threshold $\rho_i(0)=\rho_0$ according to an upper bound limitation of initial parameters; and step 302: when $t>0$, generating, by each observer i, threshold information of each moment according to the following dynamics model:

$$\dot{\rho}_i(t) = -\mu\left(1 + \frac{m_0 \lambda_m^P}{m_1 \lambda_M^P}\right)\rho_i(t),$$

where $\lambda_m^P$ and $\lambda_M^P$ minimum and maximum eigenvalues of the matrix P, respectively, and parameters $\mu$, $m_0$, $m_1$ are seen in step 401; then the magnitudes of $z_i(t)$ and $\rho_i(t)$ at each moment are compared, if $z_i(t)>\rho_i(t)$, the observer determines that the ith sensing channel is attacked, and the communication topology thereof is switched; otherwise, the observer i still sends the observation information to all neighbors $N_i$ according to the original communication topology.

Finally, the performing iterative updating to generate new observation data in combination with self observation data and received neighbor observation information, and taking whether the residual signal is greater than a current threshold or not as a standard for determining whether a corresponding communication channel is attacked or not in step 4 specifically includes the following steps:

step 401: receiving, by the double-layer observer i, a measurement output and state estimation information of all the neighbors, and then representing the dynamic update thereof using the following formula:

$$\begin{cases} \dot{\hat{x}}_i^1(t) = A\hat{x}_i^1(t) + L[\theta_i(t)(y_i(t) - C\hat{x}_i^1(t)) + (1-\theta_i(t))C(\hat{x}_i^2(t) - \hat{x}_i^1(t))], \\ \dot{\hat{x}}_i^2(t) = A\hat{x}_i^2(t) + BK\sum_{j=1}^{N} a_{ij}[\theta_j(t)\hat{x}_j^1(t) + (1-\theta_j(t))\hat{x}_j^2(t) - \hat{x}_i^2(t)], \end{cases}$$

where $\hat{x}_i^1(t)$, $\hat{x}_i^2(t)$ are states corresponding to two layers of observers, $L=P^{-1}C^T$ is a gain matrix whereby A–LC is Hurwitz-stable, and there are a constant $m_0>0$, $m_1>0$ and a positive definite matrix P for a given constant $0<\mu<\kappa$ whereby the following LMI is satisfied:

$$\begin{bmatrix} I_N \otimes (PA + A^T P - 2C^T C + m_0 I + \mu P) & -\mathcal{L} \otimes PBK \\ -(\mathcal{L} \otimes PBK)^T & I_N \otimes (-m_1 I + \mu P) \end{bmatrix} < 0.$$

$\theta_i(t)=0/1$ represents that an observation center determines whether the ith channel is manipulated by an attacker or not, and the value thereof is changed whereby the communication topology of the double-layer observer is switched dynamically; and step 402: describing an assignment standard for an attack identification logic $\theta_i(t)$ of the observer i as follows:

$$\theta_i(t) = \begin{cases} 1, & z_i(t) \le \rho_i(t), \\ 0, & z_i(t) > \rho_i(t). \end{cases}$$

where if $\theta_i(t)=0$, the observer determines that the ith transmission channel is attacked, otherwise, the observer determines that the ith transmission channel is not attacked.

The present disclosure has the following beneficial effects. According to the present disclosure, the real state of the system can he securely reconstructed after some of the transmitted data in the sensing channel has been tampered by an attacker, and a basis is provided for the secure decision-making and operation of the multi-agent system in the network attack environment. On the one hand, the existing secure state reconstruction method solves a problem by transforming the problem into a high-dimensional optimization problem. According to the present disclosure, by constructing a double-layer dynamic switching distributed observer, the injection of an attack and the comparison relationship between a corresponding residual signal and an attenuation threshold are in one-to-one correspondence, thereby effectively increasing the detection efficiency of malicious attacks, and at the same time ensuring that the system state of multi-agents can be securely reconstructed, so as to reduce the possibility of network system crash. On the other hand, the present disclosure achieves the identification of sparse sensing attacks while ensuring the secure reconstruction of the real state of the system through the cooperation of switching topology and logic identification algorithms. The dynamic switching of the communication topology between observers prevents the transmission of attacks between the observers, thereby effectively suppressing the impact of attackers on the system observers.

DETAILED DESCRIPTION

Figure 1:
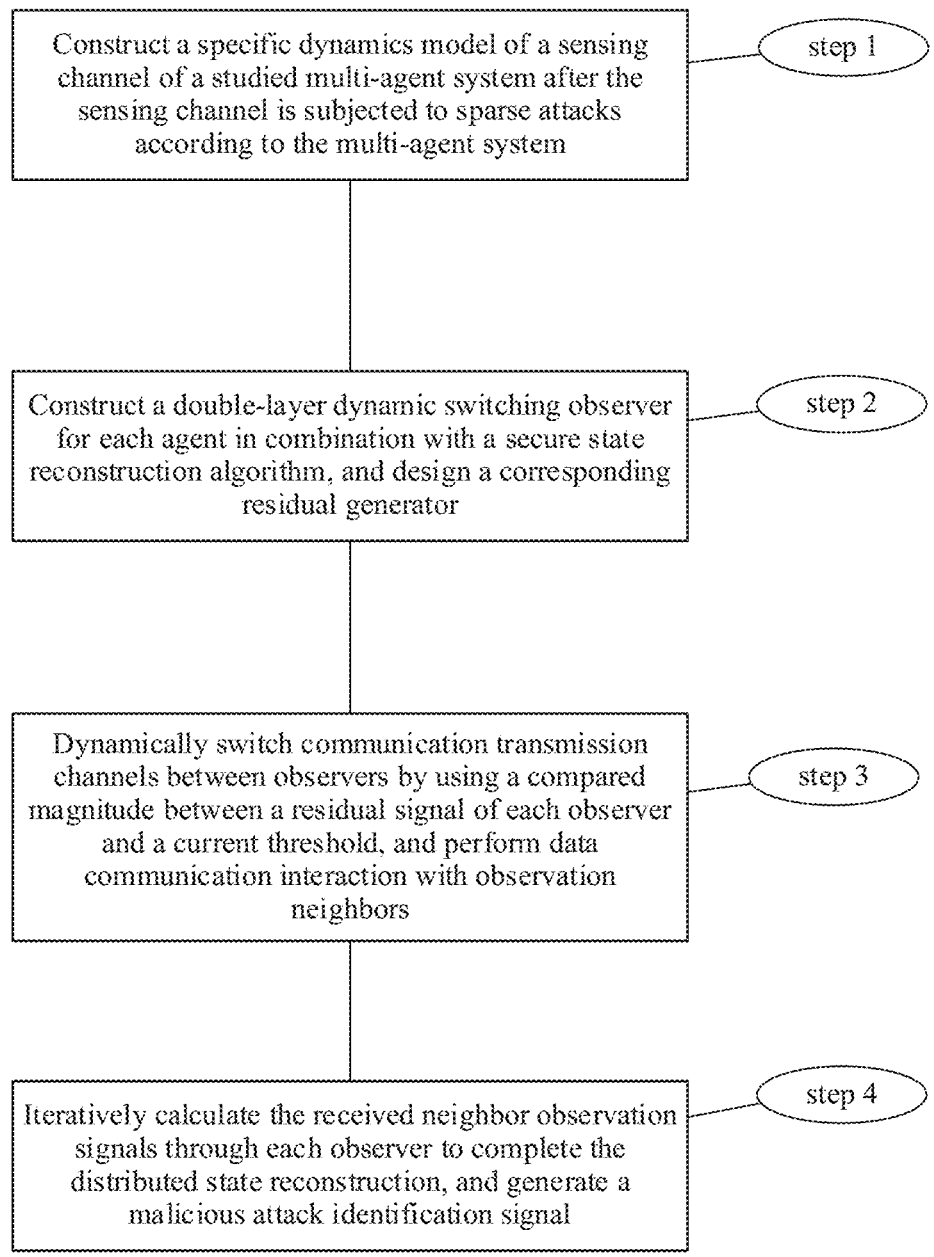
FIG. 1 is a schematic diagram of steps of a distributed secure state reconstruction method based on a double-layer dynamic switching observer according to the present disclosure.

As shown in FIG. 1, a distributed secure state reconstruction method based on a double-layer dynamic switching observer includes the following steps:

step 1: constructing a specific dynamics model of a sensing Channel of a studied multi-agent system after the sensing channel is attacked according to the multi-agent system.

In this embodiment of the present disclosure, the step specifically includes: step 101: describing the dynamics model of the multi-agent system after the sensing channel is subjected to sparse attacks as follows:

$$\begin{cases} \dot{x}_i(t) = Ax_i(t) + BK < \sum_{j=1}^{N} a_{ij}(x_j(t) - x_i(t)), \\ y_i(t) = Cx_i(t) + \gamma_i(t)d_i(t), \end{cases}$$

where $x_i(t)$, $y_i(t)$, $d_i(t)$ are an n-dimensional real state of an ith agent, a p-dimensional dimensional measurement output, and a p-dimensional attack input on a corresponding sensing channel, respectively, $\alpha_{ij}$ represents weight information between two agents, $\gamma_i(t) \in \{0,1\}$ represents whether the sensing channel corresponding to the ith agent is attacked or not, $$\left| \sum_{i=1}^{N} \gamma_i(t) \right| < s < N/2,$$

and N is the number of agents; matrices A, B, C are a system state parameter matrix and a measurement matrix, respectively, and $K=1/\lambda_2^L B^T P^{-1}$ is a consistency control input, and satisfies, for a positive definite matrix P and a constant $\kappa>0$, the following LMI: $AP+PA^T-2BB^T+\kappa P<0$, where $\lambda_2^L$ is a second small characteristic root of a Laplacian matrix L corresponding to the communication topology of the multi-agent system.

step 2: constructing a double-layer dynamic switching observer for each agent, and generating a corresponding residual.

In this embodiment of the present disclosure, the step specifically includes: step 201: constructing a double-layer observer based on residual information for each agent. When determining that a corresponding sensing channel is not attacked, the first-layer observer estimates the state of the multi-agent system mainly using a measurement residual mainly using a measurement residual, and sends observation data thereof to a second-layer observation neighbor otherwise, when determining that the sensing channel is attacked, the observer achieves state observation using an error between the two layers of observers, and stops sending the observation data to the neighbor. The second-layer observer performs distributed state estimation mainly based on the observation data sent by the observation neighbor thereof, and sends observation data thereof to the observation neighbor thereof only after the observer determines that the corresponding sensing channel is attacked.

step 202: constructing a corresponding residual generator based on the dynamics model of the multi-agent and the double-layer observer, specifically as follows:

an observation residual of an agent i is denoted as $\varepsilon_i(t)=y_i(t)-C\hat{x}_i^1(t)$, and a corresponding test residual is composed of an observation residual and a Lyapunov matrix, and denoted as $z_i(t)=\|Q^T C^T \varepsilon_i(t)\|^2$, where $Q^T Q = P$ is the Lyapunov matrix.

step 3: dynamically switching communication transmission channels between the observers by using a magnitude between the residual signal generated by each observer and a current threshold, and performing observation signal transmission interaction with neighbors.

In this embodiment of the present disclosure, the step specifically includes:

step 301: determining, for each observer i, an upper bound of an initialization observation error threshold $\sigma_i(0)\|Q^{-T}C^T\varepsilon_i(0)\|^2$ as prior information thereof by default; otherwise, obtaining a common initialization error upper bound threshold $\sigma_i(0)=\sigma_0$ according to an upper bound limitation of initial parameters; and step 302: when $t>0$, generating, by each observer i, threshold information of each moment according to the following dynamics model:

$$\dot{\rho}_i(t) = -\mu\left(1 + \frac{m_0 \lambda_m^P}{m_1 \lambda_M^P}\right)\rho_i(t),$$

where $\lambda_m^P$ and $\lambda_M^P$ are minimum and maximum eigenvalues of the matrix P, respectively, and parameters $\mu$, $m_0$, $m_1$ are seen in step 401; then the magnitudes of $z_i(t)$ and $\sigma_i(t)$ at each moment are compared, if $z_i(t)>\sigma_i(t)$ the observer determines that the ith sensing channel is attacked, and the communication topology thereof is switched; otherwise, the observer i still sends the observation information to all neighbors $N_i$ according to the original communication topology.

step 4: performing iterative updating to the neighbor observation signals received by each observer to complete the distributed state reconstruction, and generating a malicious sensing attack identification signal.

In this embodiment of the present disclosure, the step specifically includes:

step 401: receiving, by the double-layer observer i, a measurement output and state estimation information of all the neighbors, and then representing the dynamic update thereof using the following formula:

$$\begin{cases} \dot{\hat{x}}_i^1(t) = A\hat{x}_i^1(t) + L[\theta_i(t)(y_i(t) - C\hat{x}_i^1(t)) + (1 - \theta_i(t))C(\hat{x}_i^2(t) - \hat{x}_i^1(t))], \\ \dot{\hat{x}}_i^2(t) = A\hat{x}_i^2(t) + BK\sum_{j=1}^N a_{ij}[\theta_j(t)\hat{x}_j^1(t) + (1 - \theta_j(t))\hat{x}_j^2(t) - \hat{x}_i^2(t)], \end{cases}$$

where $\hat{x}_i^1(t)$, $\hat{x}_i^2(t)$ are states corresponding to two layers of observers, $L = P^{-1}C^T$ is a gain matrix whereby $A-LC$ is Hurwitz-stable, and there are a constant $m_0 > 0$, $m_1 > 0$ and a positive definite matrix P for a given constant $0 < \mu < \kappa$ whereby the following UM is satisfied:

$$\begin{bmatrix} I_N \otimes (PA + A^T P - 2C^T C + m_0 I + \mu P) & -\mathcal{L} \otimes PBK \\ -(\mathcal{L} \otimes PBK)^T & I_N \otimes (-m_1 I + \mu P) \end{bmatrix} < 0.$$

where $\theta_i(t) = 0/1$ represents that an observation center determines whether the ith channel is manipulated by an attacker or not, and the value thereof is changed whereby the communication topology of the double-layer observer is switched dynamically; and step 402: describing an assignment standard for an attack identification logic $\theta_i(t)$ of the observer i as follows:

$$\theta_i(t) = \begin{cases} 1, & z_i(t) \leq \rho_i(t), \\ 0, & z_i(t) > \rho_i(t). \end{cases}$$

where if $\theta_i(t) = 0$, the observer determines that the ith transmission channel is attacked, otherwise, the observer determines that the ith transmission channel is not attacked.

Embodiment 1 step 1: a dynamics model of a multi-agent system composed of 5 unmanned trolleys is as follows:

$$\begin{cases} \begin{pmatrix} \dot{p}_i \\ \dot{v}_i \\ \dot{a}_i \end{pmatrix} = \begin{pmatrix} 0 & 1 & 0 \\ 0 & 0 & 1 \\ 0 & 0 & -2 \end{pmatrix} \begin{pmatrix} p_i \\ v_i \\ a_i \end{pmatrix} + \begin{pmatrix} 0 \\ 0 \\ 2 \end{pmatrix} \sum_{j=1}^5 K a_{ij} \left( \begin{pmatrix} p_j \\ v_j \\ a_j \end{pmatrix} - \begin{pmatrix} p_i \\ v_i \\ a_i \end{pmatrix} \right), \\ y_i = \begin{pmatrix} 1 & 0 & 0 \\ 0 & 1 & 0 \end{pmatrix} \begin{pmatrix} p_i \\ v_i \\ a_i \end{pmatrix} + \gamma_i d_i(t), \end{cases}$$

an attacker randomly selects sensing transmission channels of 2 trolleys every 5 s to perform attack injection, and a bad data injection function thereof is $d_i(t) = (-ip_i \, 0.5e^{t/20})^T$.

Figure 2:
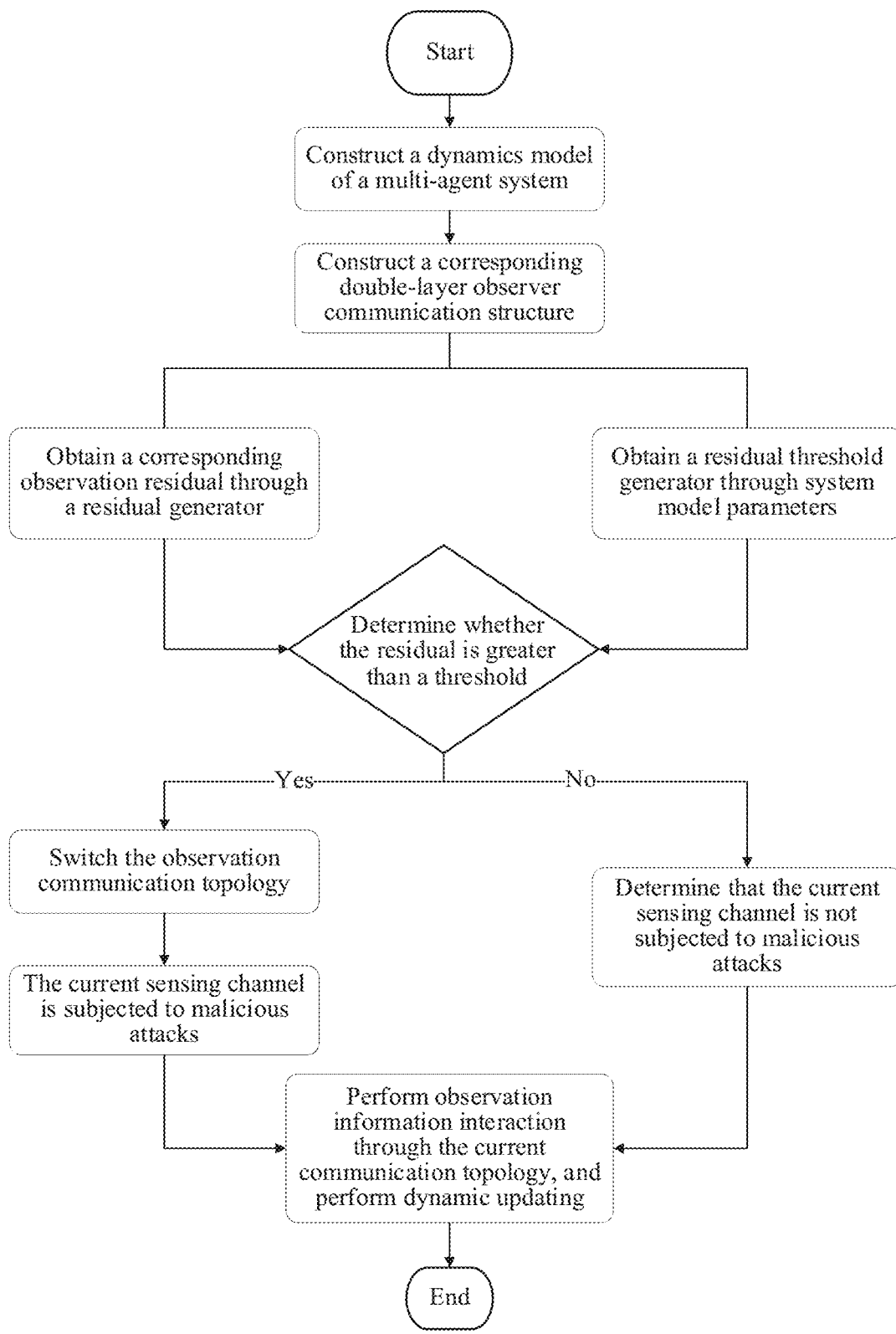
FIG. 2 is a specific flowchart of a distributed secure state reconstruction method based on a double-layer dynamic switching observer according to the present disclosure.
Figure 3:
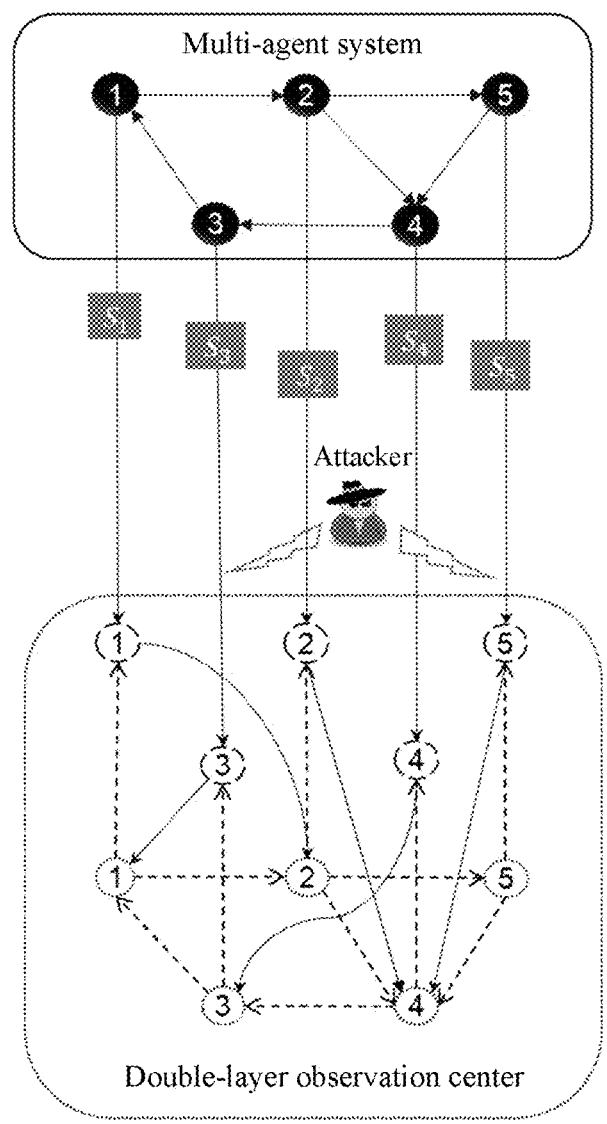
FIG. 3 is a structural diagram of communication topology of a multi-agent system and a double-layer observer design provided by an example of the present disclosure.

Next, parameters are correspondingly solved in accordance with the flow described in FIG. 2 to achieve the distributed secure state observation of multi-agents.

step 2: the communication topology between 5 trolleys and a double-layer observer is shown in FIG. 3. The dotted circles represent a first-layer observer and a second-layer observer respectively. The solid line in an observer channel represents a communication topology channel when the observer determines that there is no malicious attack. The dashed line represents a communication channel which is switched dynamically when the observer determines that there is a malicious attack. Step 3: relevant parameters of a controller and the observers are selected as follows:

$$K = (1.1143 \; 2.3376 \; 0.9535), \; \kappa = 1, \; \mu = 0.8, \; \lambda = 13.4795$$
$$L = \begin{pmatrix} 3.1826 & 2.4104 \\ 2.4104 & 5.1258 \\ 1.0126 & 2.6808 \end{pmatrix}, \; P = \begin{pmatrix} 0.4942 & -0.2594 & -0.0516 \\ -0.2594 & 0.4463 & -0.2470 \\ -0.0516 & -0.2470 & 0.4260 \end{pmatrix}.$$

Figure 4:
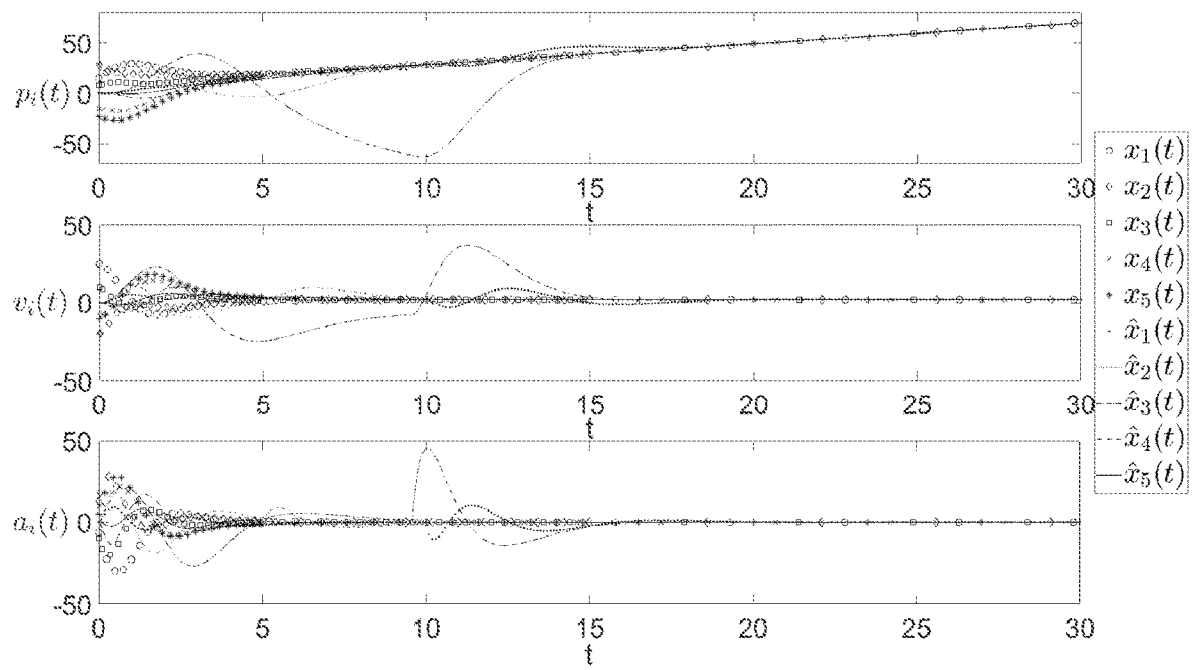
FIG. 4 is a schematic diagram of the state of the real state and observer reconstruction for a multi-agent system provided by an example of the present disclosure.

FIG. 4 shows a real state of an agent and observation data of a 2nd-layer observer. It can be seen that the double-layer observer proposed in the present disclosure can achieve the secure state reconstruction in the presence of malicious attackers.

Figure 5:
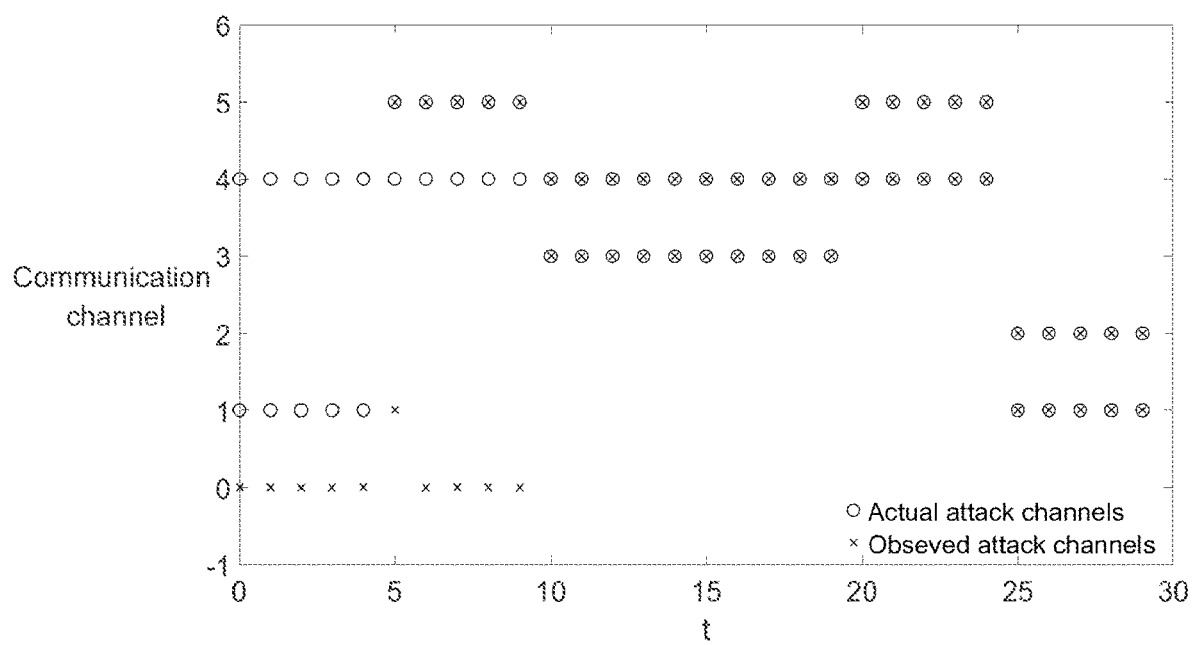
FIG. 5 is a schematic diagram of a channel index of an actual attack and an attack index identified by an observer provided by an example of the present disclosure.

FIG. 5 shows attack indexes of each sensing transmission channel at each moment and attack indexes identified by the observers The hollow circles represent the actual attack channel indexes at the current moment, the crosses represent the attack indexes identified by the observers, and ordinate 0 represents the empty attack indexes. It can be seen that after t>10 s, the identification indexes of the double-layer observer about the attack may successfully match the real attack indexes, indicating that sparse sensing attacks may be detected and identified by the double-layer observer proposed in the present disclosure. The effectiveness of the distributed secure state estimation method based on a double-layer dynamic switching observer proposed in the present disclosure is proved.

What is claimed is:

1. A distributed secure state reconstruction method based on a double-layer dynamic switching observer, by using at least one processor, comprising:

constructing, using the at least one processor, a specific dynamics model of a sensing channel of a studied multi-agent system after the sensing channel is attacked according to the multi-agent system; and describing the dynamics model of the multi-agent system after the sensing channel is subjected to sparse attacks as follows:

$$\begin{cases} \dot{x}_i(t) = Ax_i(t) + BK < \sum_{j=1}^N a_{ij}(x_j(t) - x_i(t)), \\ y_i(t) = Cx_i(t) + \gamma_i(t)d_i(t), \end{cases}$$

where $x_i(t)$, $y_i(t)$, $d_i(t)$ are an n-dimensional real state of an ith agent, a p-dimensional measurement output, and a p-dimensional attack input on a corresponding sensing channel, respectively, $\alpha_{ij}$ represents weight information between two agents, $\gamma_i(t) \in \{0,1\}$ represents whether the sensing channel corresponding to the ith agent is attacked or not, $$\left| \sum_{i=1}^N \gamma_i(t) \right| < s < N/2,$$

and N is the number of agents; matrices A, B, C are a system state parameter matrix and a measurement matrix, respectively, and a matrix $K=1/\lambda_2^L B^T P^{-1}$ is a consistency control input matrix and satisfies, for a positive definite matrix P and a constant $\kappa>0$, the following formula: $AP+PA^T-2BB^T+\kappa P<0$, where $\lambda_2^L$ is a second small characteristic root of a Laplacian matrix L corresponding to the communication topology of the multi-agent system.

building a double-layer observer for each multi-agent in combination with a specific multi-agent system model, constructing a proper observation communication topology, and designing a corresponding residual generator, specifically comprising the following steps:

constructing a double-layer observer based on residual information for each agent, wherein when determining that a corresponding sensing channel is not attacked, the first-layer observer estimates the state of the multi-agent system mainly using a measurement residual, and sends observation data thereof to a second-layer observation neighbor; otherwise, when determining that the sensing channel is attacked, the observer achieves state observation using an error between the two layers of observers, and stops sending the observation data to the neighbor; and the second-layer observer performs distributed state estimation mainly based on the observation data sent by the observation neighbor thereof, and sends observation data thereof to the observation neighbor thereof only after the observer determines that the corresponding sensing channel is attacked; and constructing a corresponding residual generator based on the dynamics model of the multi-agent and the double-layer observer, specifically as follows:

an observation residual of an agent i is denoted as $\varepsilon_i(t)=y_i(t)-C\hat{x}_i^1(t)$, and a corresponding test residual is composed of an observation residual and a Lyapunov matrix, and denoted as $Z_i(t)=\|Q^{-T}C^T\varepsilon_i(t)\|^2$, where $Q^T Q=P$ is the Lyapunov matrix;

analyzing dynamic information generating a residual threshold aiming at an observation model, checking a magnitude between each residual signal and the threshold, dynamically switching the communication topology between the observers according to the compared magnitude, and performing a new data communication interaction; and performing iterative updating to generate new observation data in combination with self-observation data and received neighbor observation information, and taking whether the residual signal is greater than a current threshold or not as a standard for determining whether a corresponding communication channel is attacked or not.

2. The distributed secure state reconstruction method based on a double-layer dynamic switching observer according to claim 1, wherein the analyzing dynamic information generating a residual threshold aiming at an observation model, checking a magnitude between each residual signal and the threshold, dynamically switching the communication topology between the observers according to the compared magnitude, and performing a new data communication interaction specifically comprises the following steps:

determining, for each observer i, an upper bound of an initialization observation error threshold $\rho_i(0)=\|Q^{-T}C^T\varepsilon_i(0)\|^2$ as prior information thereof by default; otherwise, obtaining a common initialization error upper bound threshold $\rho_i(0)=\rho_0$ according to an upper bound limitation of initial parameters; and when $t>0$, generating, by each observer i, threshold information of each moment according to the following dynamics model:

$$\dot{\rho}_i(t) = -\mu\left(1 + \frac{m_0 \lambda_m^P}{m_1 \lambda_M^P}\right)\rho_i(t),$$

where $\lambda_m^P$ and $\lambda_M^P$ are minimum and maximum eigenvalues of the matrix P, respectively, and constant $m_0>0$, constant $m_1>0$, constant $0<\mu<\kappa$, and constant $\kappa>0$; then the magnitudes of $z_i(t)$ and $\rho_i(t)$ at each moment are compared, if $z_i(t)>\rho_i(t)$, the observer determines that the ith sensing channel is attacked, and the communication topology thereof is switched; otherwise, the observer i still sends the observation information to all neighbors $N_i$ according to the original communication topology.

3. The distributed secure state reconstruction method based on a double-layer dynamic switching observer according to claim 1, wherein the performing iterative updating to generate new observation data in combination with self-observation data and received neighbor observation information, and taking whether the residual signal is greater than a current threshold or not as a standard for determining whether a corresponding communication channel is attacked or not specifically comprises:

receiving, by the double-layer observer i, a measurement output and state estimation information of all the neighbors, and then representing the dynamic update thereof using the following formula:

$$\begin{cases} \dot{\hat{x}}_i^1(t) = A\hat{x}_i^1(t) + L[\theta_i(t)(y_i(t) - C\hat{x}_i^1(t)) + (1-\theta_i(t))C(\hat{x}_i^2(t) - \hat{x}_i^1(t))], \\ \dot{\hat{x}}_i^2(t) = A\hat{x}_i^2(t) + BK\sum_{j=1}^{N} a_{ij}[\theta_j(t)\hat{x}_j^2(t) + (1-\theta_j(t))\hat{x}_j^2(t) - \hat{x}_i^2(t)], \end{cases}$$

where $\hat{x}_i^1(t)$, $\hat{x}_i^2(t)$ are states corresponding to two layers of observers, $L=P^{-1}C^T$ is a gain matrix whereby A−LC is Hurwitz-stable, and there are a constant $m_0>0$, $m_1>0$ and a positive definite matrix P for a given constant $0<\mu<\kappa$ whereby the following LMI is satisfied:

$$\begin{bmatrix} I_N \otimes (PA + A^T P - 2C^T C + m_0 I + \mu P) & -\mathcal{L} \otimes PBK \\ -(\mathcal{L} \otimes PBK)^T & I_N \otimes (-m_1 I + \mu P) \end{bmatrix} < 0.$$

where $\theta_i(t)=0/1$ represents that an observation center determines whether the i th channel is manipulated by an attacker or not, and the value thereof is changed whereby the communication topology of the double-layer observer is switched dynamically; and describing an assignment standard for an attack identification logic $\theta_i(t)$ of the observer i as follows:

$$\theta_i(t) = \begin{cases} 1, & z_i(t) \leq \rho_i(t), \\ 0, & z_i(t) > \rho_i(t). \end{cases}$$

where if $\theta_i(t)=0$, the observer determines that the i th transmission channel is attacked, otherwise, the observer determines that the i th transmission channel is not attacked.

* * * * *